United States Patent [19]

Schilling et al.

[11] 4,413,175

[45] Nov. 1, 1983

[54] HEAT LEVEL INDICATION METHOD AND APPARATUS

[75] Inventors: Wilfried Schilling, Kraichtal; Siegberg Lorenz, Bretten; Friedrich Koch, Oberderdingen, all of Fed. Rep. of Germany

[73] Assignee: E.G.O. Regeltechnik GmbH, Fed. Rep. of Germany

[21] Appl. No.: 227,506

[22] Filed: Jan. 22, 1981

[30] Foreign Application Priority Data

Jan. 31, 1980 [DE] Fed. Rep. of Germany ....... 3003419

[51] Int. Cl.³ .......................... G06G 7/00; G01K 1/00
[52] U.S. Cl. ..................................... 377/25; 340/584; 374/102; 374/103; 374/176
[58] Field of Search ................... 364/551; 235/92 MT, 235/92 MS; 73/339 R, 359 R; 219/453, 506; 340/584, 588, 589; 374/102, 103

[56] References Cited

U.S. PATENT DOCUMENTS

Re. 30,619  5/1981  Decker ................................. 340/584
3,601,586  8/1971  Slavin ............................. 235/92 MT Primary Examiner—Joseph A. Orsino, Jr.
Attorney, Agent, or Firm—Steele, Gould & Fried

[57] ABSTRACT

A method for indicating the thermal state of cooking appliances with an optical and/or acoustic signalling device, comprising the steps of: counting forward from a starting number in response to the heating means of the cooking appliance being switched on; and, counting backwards after the heating means of the cooking appliance has been switched off, the signalling device being switched on when the count exceeds a first number and being switched off when the count falls below a second number.

An apparatus for indicating the thermal state of cooking appliance with an optical and/or acoustic signalling device, comprising: an electronic bidirectional counter; clock generating logic for controlling clock pulses to the counter; a detector connected to the logic for determining the switching on and off of the heating means of the cooking appliance, the counter being clocked upwardly after the switching on, and being clocked downwardly after the switching off; and, at least one count recognition circuit connected to the counter, which on reaching predetermined numbers switches the signalling device on and off.

In both the method and apparatus the rate of forward and backward counting can be made proportional to the actual heating and cooling characteristics of the cooking appliances.

23 Claims, 6 Drawing Figures

HEAT LEVEL INDICATION METHOD AND APPARATUS

The invention relates to a method and apparatus for indicating the thermal state of a cooking appliance with an optical and/or acoustic signalling device.

Cooking appliances, particularly glass ceramic hotplates, are normally provided with a signalling device which indicates that the cooking appliance surface is warm or hot. It is generally a problem to construct the indication means in such a way that the signalling device does not switch on or off too early or too late.

It has already been proposed to control the signalling device on a time basis only, so that after the switching off of the final heating means, the signalling device remains actuated for a fixed time of approximately 30 to 40 minutes. However, this means that when the heating means is only switched on for a short time, there is an unnecessarily long indication of an existing hot state, when in fact the cooking appliance has cooled. A further disadvantage of the already proposed solutions is that upon switching on the heating means an indication or warning is given, although the cooking surface is still not hot at this time.

The object of the invention is to provide a method of the aforementioned type which permits a correct indication under all conditions and which can also be simply performed.

According to the invention, this object is achieved by a method of the aforementioned type wherein upon switching on the heating means of the cooking appliance forward counting takes place from a starting number and after switching off the heating means of the cooking appliance backward counting takes place, the signalling device being switched on on exceeding a first number and switched off on dropping below a second number.

By means of this method, it is possible on the one hand to take account of the fact that when the heating means has only been switched on for a short time a hot state is not indicated, while on the other hand the time until the hot state indication is switched off again is dependent on the number to which forward counting took place when the heating means was switched on. Thus, it is also possible to prevent an unnecessarily prolonged hot state indication. The starting number can be any number which is greater than or equal to zero. Thus, for example, the first number which leads to the switching on of the signalling device can be equal to or greater than the starting number. The second number which leads to the switching off of the signalling device again can, for example, be the number zero.

As in general the heating-up time and cooling time of a cooking appliance differ, the invention also encompasses forward and backward counting at different speeds.

Since after a certain time, there is generally no increase in the temperature of a cooking appliance, the invention also provides for an interruption of forward counting or reaching a maximum number. This obviates an unnecessarily high count.

In order to ensure a particularly good adaptation of the hot state indication to the heating-up and cooling characteristics of the cooking appliance, according to another feature of the invention, backward counting takes place at a speed dependent on the number reached at the end of forward counting and/or the number of heating means on the cooking appliance which have been in operation.

As a result, account is taken of the fact that within a given range the cooling time increases in proportion to the time during which the heating means was switched on. In addition, the cooling time increases as a function of the number of hotplates of the cooking appliance switched on during a given period.

According to a further aspect of the invention, forward and rearward counting takes place with constant speed. Counting with a constant counting speed, at least within defined zones or ranges can be performed particularly easily. If when counting the constant speed is changed after a certain time to another, also constant speed, it is possible to bring about a particularly good correlation to the heating-up or cooling characteristics.

It is particularly simple if the signalling device is switched off on reaching the number zero.

It is a further object of the invention to provide an apparatus for indicating the thermal state of a cooking appliance with an optical and/or acoustic signalling device, particularly for performing the method according to the invention, which permits an optimum precise indication of the hot state, which is easy and inexpensive to manufacture and fit and can be installed in space-saving manner at a random point of the cooking appliance.

According to the invention, this object is achieved by an apparatus of the aforementioned type, comprising an electronic bidirectional, up/down counter, a clock generating logic controlling the counter, a detector means connected to the logic for determining the switching on or off of the heating means of the cooking appliance, as well as at least one count recognition circuit or decoder connected to the counter stages of the counter, which on reaching a predetermined number switches the signalling device on and/or off.

The clock generating logic serves to increment or decrement the counter forwards or backwards. The information on whether the counter is to count forwards or backwards is supplied by the detector means which senses the switching state of the heating means of the cooking appliance, so as to recognize whether counting is to take place forwards or backwards. Even if only one single cooking appliance heating means is switched on, the detector means signals the counter to increase its content by one on receiving a pulse from the clock generating logic. The detector means can be connected to the switches of the cooking appliance heating means e.g. in such a way that it has a number of circuits corresponding to the number of switches and which are mechanically coupled to the cooking appliance switches. However, a direct or contactless, e.g. inductive coupling of the inputs of the detector circuits to the direct cooking appliance heating means is also conceivable.

The clock generating logic can, for example, contain an oscillator which, after a corresponding scaling down of its pulses, increments the counter forward (up).

According to a further development of the invention the clock generating logic is constructed in such a way that on sensing the switching on of the cooking appliance heating means, it sets the counter to the starting number and permits the forward counting thereof at a predetermined frequency. For this purpose, the clock generating logic is connected to the counter, the connection in the counter being by means of logic switching elements in such a way that when there is a signal on the connection, the individual counter stages are set to corresponding values.

As an alternative to oscillator control, the logic can be connected at least to the final counter stages thereof. According to this feature, the scaling down of the time signal is performed in the pre-counter, the clock generator logic being controllable by a pre-counter stage, whose signals have already been correspondingly scaled down. The clock generating logic is connected to the final counter stages, e.g. the last six stages. Thus, the clock generating logic senses the content of the last six forward pre-counter stages.

As the count recognition circuit switches off the signalling device when a predetermined number, e.g. the number zero is present in the counter, it must be ensured that the counter content does not become zero in the case of counter overflow during its forward counting. The same applies when backward counting. To this end, according to another feature of the invention, the counter has a carry-out output connected to the pre-counter and/or the clock generating logic which, when the counter is at maximum and minimum count, prevents the forward or backward counting thereof.

It is particularly advantageous if the pre-counter is controllable by the mains frequency, so that there is no need for it to have its own oscillator.

According to a further development of the invention, upon switching off the cooking appliance heating means, the clock generating logic permits the backward counting of the counter with a frequency dependent on the momentary state of the counter or pre-counter. As a result, the time after which the signalling device is switched off after disconnecting the heating means is dependent upon the switching on time.

It is particularly advantageous if there is a count recognition circuit which switches on the signalling device at a count differing from zero. Thus, when forward counting, the signalling device is switched on when number 1 is reached, while the signalling device is switched off again upon reaching zero during backward counting.

The starting number can be made equal to the maximum number storable in the counter. It is particularly advantageous if the pre-counter is an 11 to 15 stage asynchronous counter, the counter then preferably being a four-stage binary counter.

It has proved to be advantageous if the clock generating logic sets the counter to a number between 1 and 5 approximately 0.1 to 0.4 minutes after switching-on.

An example for a particularly favourable forward counting characteristic is defined as a time interval of 0.2 to 0.8 minutes and in the first interval the clock generating logic supplies 3 to 9 pulses to the counter, in the second interval 2 to 6, in the third interval 1 to 4 and in the fourth interval 1 to 2. It must naturally be ensured that the total number of pulses does not exceed the maximum number which can be stored in the counter.

A particularly advantageous construction of the apparatus according to the invention is achieved if it contains a microprocessor performing the counting and control functions. A microprocessor permits an easy adaptation of a single apparatus to the different cooking appliances.

Other features, details and advantages of the invention can be gathered from the following description of preferred embodiments, relative to the drawings, wherein.

Figure 1:
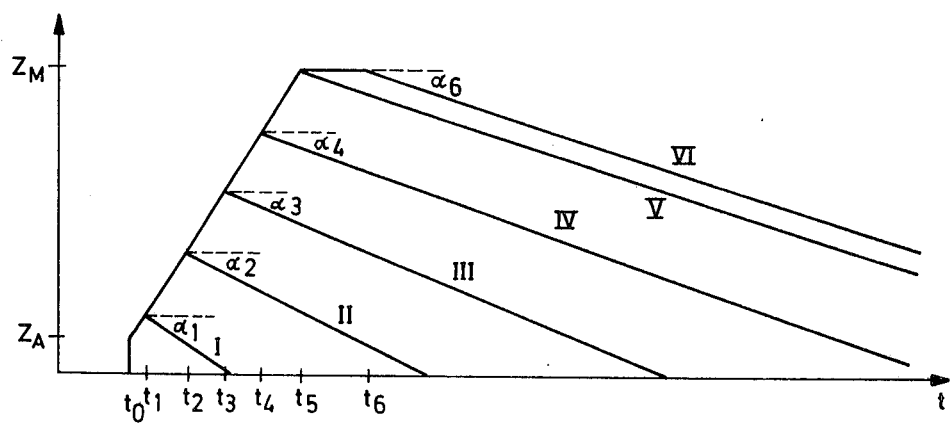
FIGS. 1 and 2 show several time sequences of a method according to the invention.

The various curves I to VI of FIG. 1 representing the time sequences of the method according to the invention differ as a result of their switching-off points t1 to t6. The rising branch of all the curves is identical, while the falling branch of all the curves has a different intersection with the representing time abscissa. In addition, curves I to V have different slopes, the slopes, i.e. the angles between the falling parts and the horizontal parts shown in dotted line form are the graphic representation of the counting speed. As is apparent from the drawing, the slope, i.e. the backward counting speed of the straight portions of curves I to V is dependent on the time to which forward counting took place up to the instant of switching off the heating means, represented by the abscissa portions t1 to t6. The longer the heating means was switched on, and correspondingly the higher the count reached during the switched-on period, the longer the period after switch-off.

It is also apparent that upon reaching the number $Z_M$ the forward counting process is interrupted.

Figure 2:
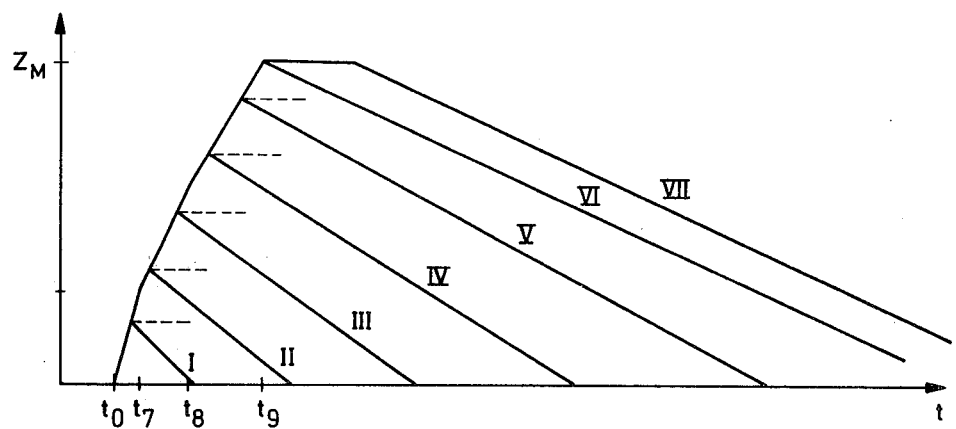

The time sequences of FIG. 2 differ from those of FIG. 1 in that forward counting is only zonally performed at a number of constant speeds in zones or ranges. It is clear that the rising part, when all the curves are identical, is constant between t0 and t7. Therefore, between t7 and t8 it is also constant, but the slope differs, corresponding to a different counting speed. Between t8 and t9 the rising curve once again has a different, but constant slope, which means that in this area forward counting again takes place with a constant, but different speed. Here again, the backward counting speed is dependent on the number reached during forward counting.

Figure 3:
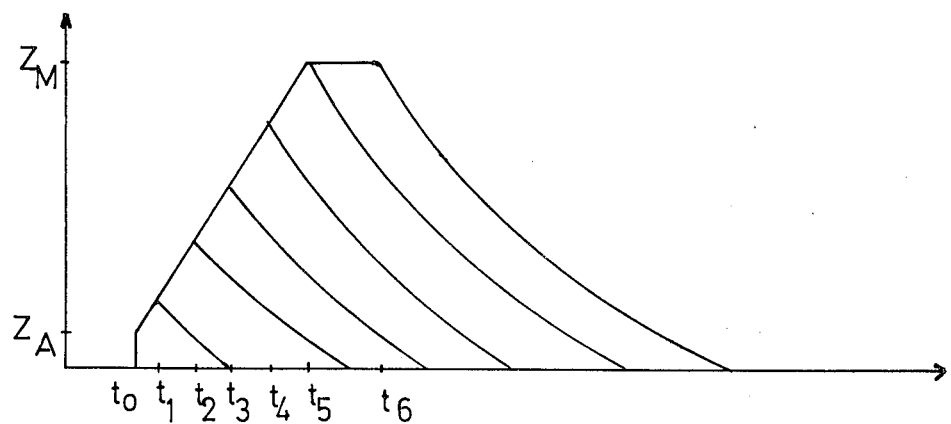
FIGS. 3 and 4 show representations similar to FIG. 1 in the case of other embodiments.
Figure 4:
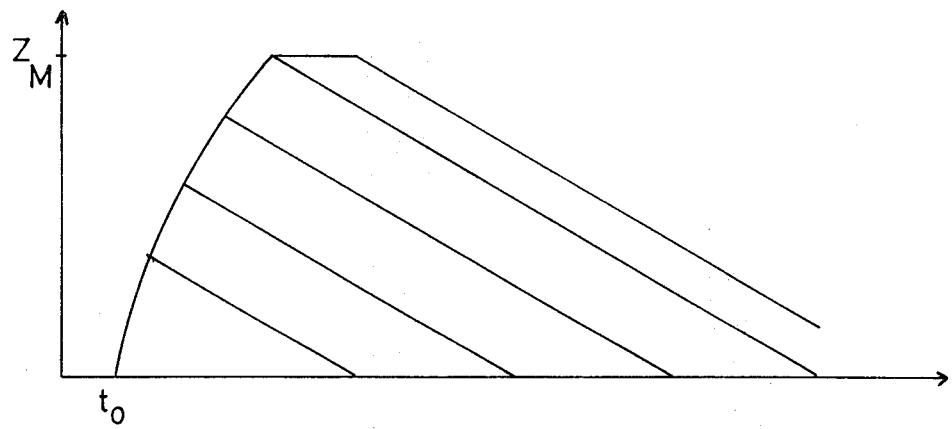

FIGS. 3 and 4 show time sequences of other embodiments of the method according to the invention. Here again, the rising branch of all the curves is identical, while the falling branches of the curves represent the different switching-off times and also have a different part.

In the method shown in FIG. 3, at the start of the switching-on process of the heating means, forward counting is commenced at number $Z_A$ and is continued at a constant speed up to the final number $Z_M$. During backward counting, the counting speed is dependent on the momentary count result. Thus, e.g. if backward counting takes place from the number 10 and after a certain time the number 9 is reached, then the further counting speed will be dependent on 9. Thus, there is an exponentially falling counting speed.

A particularly favourable and advantageous embodiment of the inventive method is shown in FIG. 4. During counting, the speed is dependent on the momentary count result. It must be borne in mind that with rising count results, the counting speed is reduced. Backward counting takes place with a constant speed, which is independent of the count result. Thus, all the falling branches of the curves in FIG. 4 are parallel straight lines.

It should be noted in connection with the embodiments of FIGS. 1 and 2 that during backward counting, the higher the count reached at the time of switching off, the lower the speed. However, with the embodiment according to FIG. 3, the higher the momentary count, the higher the backward counting speed. In the embodiment of FIG. 4, the higher the count, the lower the forward counting speed.

Figure 5:
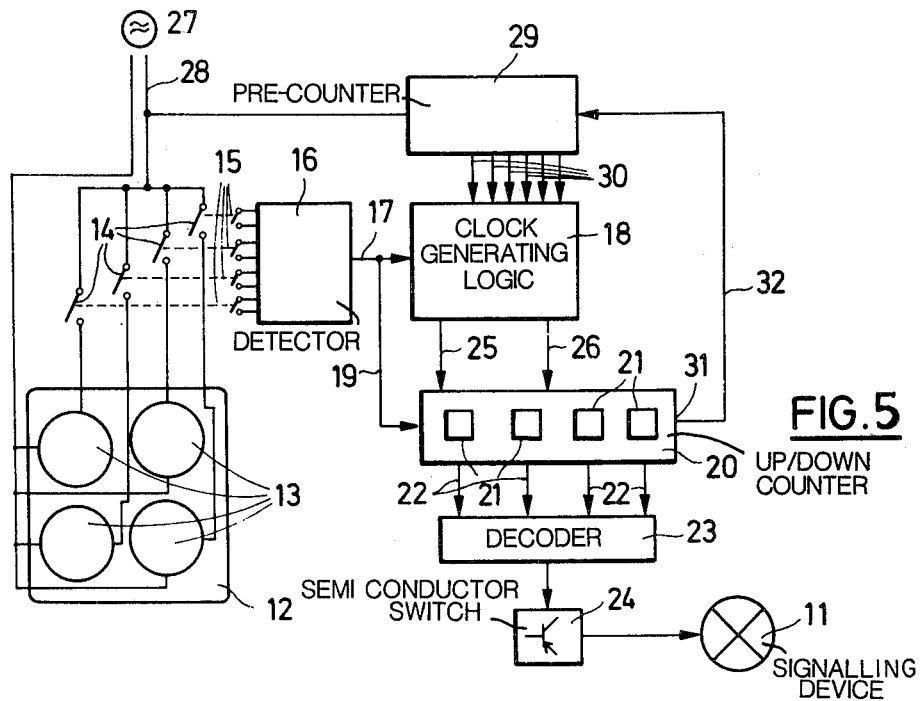
FIG. 5 is a block circuit diagram of an apparatus according to the invention.

FIG. 5 shows a block circuit diagram of an apparatus according to the invention. With the aid of a signalling device 11, e.g. an indicator light, it serves to indicate the temperature of a glass ceramic cooking surface 12, provided in the present case with four individual heating means 13 constituting the hot plates. Four manually operable switches 14 are provided for switching on the heating means 13. By means of switches 14, the heating means 13 are switched into the standard circuit. Four switches 15 are also mechanically connected to switches 14 and are connected to the input of a detector means 16.

Detector means 16 is connected by means of lines 17 to a clock generating logic 18. A second line 19 is branched from line 17 and is connected to a bidirectional, up/down counter 20. In the present embodiment this counter has four binary counter stages 21. Each of these counter stages 21 is connected by a further line 22 to a count recognition circuit or decoder 23. Circuit 23 enables activation of a semiconductor switch 24, which switches on the signalling device 11 and is connected in series with circuit 23 when certain input signals appear on lines 22.

The clock generating logic 18 is connected via two output lines 25 and 26 to counter 20. Pulses on line 25 increment or decrement the counter 20 depending on the state of line 19. If there is a signal on line 25, the content of counter 20 is increased or decreased by 1, as a function of the information supplied by the detector means 16 via line 19 to counter 20.

Line 26 serves to set counter 20 to a predetermined number. To this end, line 26 within counter 20 is correspondingly connected by logic circuits (not shown) to all four counter stages 21. The logic connection of lines 26 with the individual counter stages is dependent on the number to which the content of counter 20 is to be brought if there is a signal on line 26.

A pre-counter 29 is connected to the mains line 28 connected to an a.c. voltage supply 27, said counter serving to scale down the mains frequency and consequently acting as a time base divider. The outputs of the last six counter stages of pre-counter 29 are connected, via corresponding lines 30 to inputs of the clock generating logic 18.

Counter 20 has a carry-out output 31 connected with all its counter stages 21 connected by means of a transmission line 32 to pre-counter 29. Transmission line 32 always carries a signal if all the counter stages 21 of counter 20 are equal to one or equal to zero. The first case means that the counter content is the same as the maximum number storable in counter 20, so that no new counting pulse may be supplied via line 25 for increasing said number. This is achieved in that the carry-out output 31 is connected to pre-counter 29 via line 32, so that it no longer supplies signals controlling the clock generating logic 18.

In the second case, i.e. when all the stages 21 of counter 20 are equal to zero, it means that the number zero was reached during backward counting. In this case there must be no further backward counting, because otherwise there would again be a hot state indication by means of signalling device 11. This is also brought about by coupling the carry-out output 31 to pre-counter 29.

The detector means 16 serves to start the operation of the clock generating logic 18 via line 17 and also to indicate to counter 20 via line 19 whether the pulse arriving on line 25 should lead to an increase or decrease in the content of counter 20. If one switch 15 or more of detector means 16 is closed, this means that forward counting of counter 20 is started by means of line 19. If all switches 15 are open, the backward counting of counter 20 is started.

Clock generating logic 18 supplies counter 20 with the pulses by means of line 25, delivered at a frequency which is dependent on the last six stages of pre-counter 29.

Figure 6:
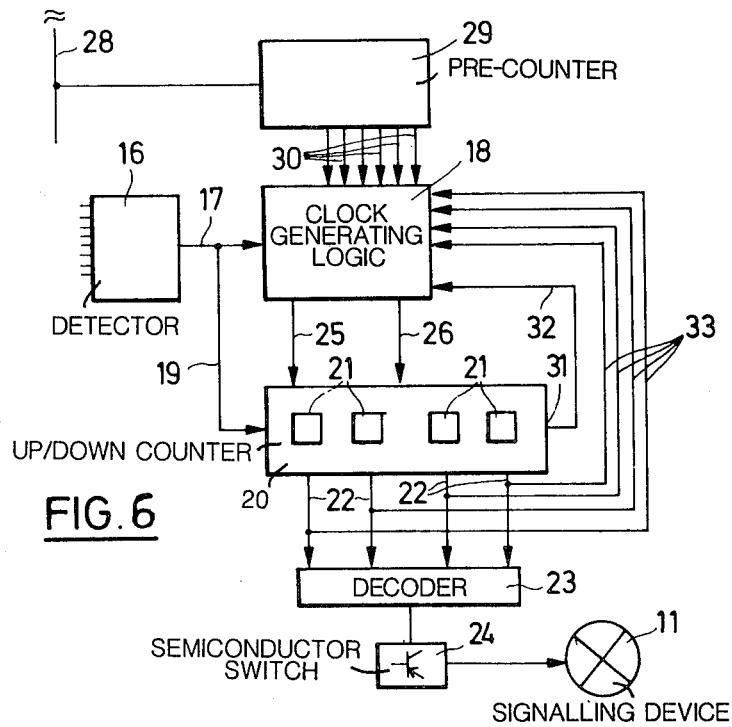
FIG. 6 is a block circuit diagram of a slightly modified apparatus according to the invention.

In the embodiment of an inventive apparatus shown in FIG. 6, the actual cooking surface 20 and the associated parts are omitted to simplify the drawing. Unlike the apparatus of FIG. 5, the output lines 22 of counter 20 are connected via lines 33 to the clock generating logic 18. In addition, carry-out output 31 of counter 20 is also connected to the clock generating logic 18 and not to pre-counter 29. The two apparatus are otherwise the same. In this embodiment of the apparatus according to the invention, the clock generating logic decodes the content of counter 20 and is constructed in such a way that it can modify the frequency or clock rate with which it supplies signals via line 25 to counter 20, as a function of the content of counter 20.

The detector means 16 can be constructed in such a way that it supplies information to the clock generating logic 18, according to which the latter makes the frequency with which it supplies signals via line 25 dependent on how many of the heating means 13 were switched on or off.

The details of the clock generating logic 18 are omitted, as the logic circuit itself can be constructed in any number of ways which would be apparent to those skilled in the art, keeping in mind the various operating modes disclosed in FIGS. 1–4. The outputs 30 of pre-counter 29 will provide six different, but constant clock rates, any one of which, or through decoding logic, any combination of which, can be gated through the clock generating logic 18 to increment or decrement the up-/down counter 20, by means of pulses transmitted on line 25. As fully explained in conjunction with the methods "illustrated" in FIGS. 1–4, there are a number of preferred counting schemes. These counting schemes may require constant clock rates in different zones or ranges of operation. In FIG. 2, for example, there are shown three distinct zones or ranges of clock rates, each one of which is constant within the particular zone or range. Accordingly, pre-counter 29 makes a plurality of constant clock rates available to the clock generating logic for gating through to the up/down directional counter 20.

Clock generating logic 18 also receives control signals from detector 16. Detector 16, through mechanically linked switches, induction switches or the like, is able to detect when any of switches 14 are opened or closed. Assuming a sufficiently long period of non-use of the cooking appliance, all switches 14 will be open and the signalling device 11 will be off. As soon as at least one of the switches 14 is closed, at least one of the monitoring or following switches 15 will also be closed. Closing of at least one switch 15 will cause the detector 16 to generate a control signal on line 17 to the clock generating logic 18, and on line 19 to the up/down counter 20. In this instance, namely activation of at least one cooking plate 13 by closing one switch 14, the logical state of line 17, 19 will cause up/down counter to be counted upward in response to clock signals received on line 25. The logic state of line 17 will cause pulses at a predetermined clock rate to be gated through the clock generating logic 18, onto line 25. The particular clock rate will depend upon which particular counting scheme has been chosen, four of which are disclosed in FIGS. 1-4. The clock rate may be constant throughout, or may be constant through a number of zones or ranges. In any event, and in any scheme chosen, if the switch 14 remains closed for a sufficient period of time, up/down counter 20 will eventually reach a maximum count. When this maximum count is reached, a signal is generated on line 32 which inhibits the output lines 30 of pre-counter 29, stopping the count. Meanwhile, count recognition circuit or decoder 23 has been receiving the output of up/down counter 20. At a predetermined count, which correlates in real time to a "hot" condition of the cooking appliance, semi-conductor switch 23 will be enabled, in turn activating signaling device 11. If switch 14 is subsequently opened, monitoring switch 15 will open and signals on line 17, 19 will cause up/down counter 20 to count downwardly in response to pulses received on line 25, and will enable pulses at a predetermined clock rate to once again be gated through clock generating logic 18 onto line 25. Eventually, up/down counter 20 will count down to zero. At zero count, a signal generated on line 32 will inhibit the ouputs 30 of pre-counter 29 by stopping the pre-counter. At the same time, count recognition circuit or decoder 23 will disable semi-conductor switch 24, in turn deactivating signaling device 11, when a second predetermined count has been reached. In the presently preferred embodiments, the predetermined count for switching off is in fact zero.

It will be appreciated by those skilled in the art that the opening and closing of switches 14 can be, and likely will be made in any number of random patterns. In a very simple embodiment, the clock generating logic 18 may be such that up/down counter 20 will count upwardly at a constant rate, as long as at least one switch 14 is closed, no matter how many times any particular switch 14 is opened or closed. This upward counting would continue until maximum count or until all switches 14 have been opened, whichever occurs first. When all switches 14 have been opened, up/down counter 20 would be counted downwardly. In a more sophisticated embodiment and in response to signals received from the detector 16, the clock rate utilized to increment the up/down counter 20 may be increased each time another switch 14 is closed. In other words, a first rate would be utilized when the first switch 14 was closed. If a second switch 14 was closed, without opening the first switch, counting would proceed at a faster clock rate. Similarly, still faster clock rates would be utilized if three of the switches or four of the switches were closed at the same time. The use of different clock rates is facilitated by outputs 30, which represent the outputs of the last six stages of pre-counter 29.

A further function of clock generating logic 18 is to control pre-setting up/down counter 20, through signals on line 26. If may be, for example, that the heating time of a particular hotplate, or all of the hotplates, does not conveniently accord with one of the clock rates available from outputs 30 of pre-counter 29. It may also be the case that one of the hotplates is designed to heat up more quickly than any of the others. In either event, detector 16 could generate a command signal to clock generating logic 18 which would appropriately preset up/down counter 20 to a higher starting number than zero, should that particular heating plate be chosen. The higher starting number might be the number at which the indicating device is activated. Those skilled in the art will appreciate that the very large number of operating modes render the depiction of a particular logic circuit difficult and unrepresentative. The use of a microprocessor is preferred.

This invention provides an improved signaling device by generating an electrical analog to the actual heating and cooling temperature curves of the cooking appliance and its individual cooking plates. The analog signal is "constructed" by an up/down counter. Different heating and cooling characteristics of different cooking appliances will require different counting rates, and different zones or ranges or counting rates, in order to accurately model the particular heating and cooling characteristics of a particular cooking appliance. The circuit diagrams illustrated in FIGS. 5 and 6 are sufficiently detailed to enable those skilled in the art to accurately model virtually any heating and cooling curve which might be encountered.

In the embodiment of FIG. 6, the outputs of the counting stages of up/down counter 20 are routed back to the clock generating logic 18 by lines 33. A decoding circuit in clock generating logic 18 can be utilized to change the clock rate in accordance with the count reached. This decoding logic can also be utilized to inhibit clock pulses on line 25 when the up count reaches maximum or the down count reaches zero. It will be apparent to those skilled in the art how such decoding circuits can be constructed, the guideline being, as ever, accurately modelling the heating and cooling curves of a particular cooking appliance with an up/down counter.

We claim:

1. A method for indicating the thermal state of cooking appliances with an optical and/or acoustic signalling device, comprising the steps of:
continuously counting forward from a starting number in response to the heating means of the cooking appliance being switched on; and,
continuously counting backwards only after the heating means of the cooking appliance has been switched off, the signalling device being switched on when the count exceeds a first number and being switched off when the count falls below a second number.

2. A method according to claim 1, wherein different counting rates are used in the forward and backward directions.

3. A method according to claims 1 or 2, wherein the forward count is interrupted on reaching a maximum number.

4. A method according to claim 1, wherein the rate of backward counting is dependent on the number reached at the end of forward counting and on the number of heating means on the cooking appliance which have been switched on.

5. A method according to claims 1 or 4, wherein the rate of forward counting is dependent on the number of heating means switched on.

6. A method according to claim 1, wherein the rates of forward and backward counting are constant within predetermined counting zones.

7. A method according to claim 1, wherein the signalling device is switched off on reaching the number zero.

8. An apparatus for indicating the thermal state of cooking appliances with an optical and/or acoustic signalling device, comprising:
an electronic bidirectional counter;
clock generating logic for controlling clock pulses to the counter;
a detector means connected to the logic for determining the switching on and off of the heating means of the cooking appliance, the counter being continuously clocked upwardly after the switching on, and being continuously clocked downwardly only after the switching off; and,
at least one count recognition circuit connected to the counter, which on reaching predetermined numbers switches the signalling device on and off.

9. An apparatus according to claim 8, wherein the clock generating logic includes means for presetting the counter to a starting number and enabling the counter upwardly at a predetermined frequency.

10. An apparatus according to claims 8 or 9, further comprising a staged pre-counter, acting as a time base divider, for providing the clock generating logic with a plurality of pulse trains, the clock generating logic being connected at least to the final stages of the pre-counter.

11. An apparatus according to claim 10, further comprising a circuit in one of the pre-counter and the clock generating logic for preventing upward and downward counting of the counter when the counter reaches its maximum and minimum count respectively, in response to a carry-out output signal generated by the counter.

12. An apparatus according to claim 10, wherein the pre-counter is controllable by the mains frequency.

13. An apparatus according to claim 10, wherein, on switching off the heating means of the cooking appliance, the clock generating logic enables the counter to count downward at a frequency dependent on the momentary state of one of the counter and the pre-counter.

14. An apparatus according to claim 8, wherein the at least one count recognition circuit switches on the signalling device when the count differs from zero.

15. An apparatus according to claim 9, wherein the starting number is the same as the maximum number which can be stored in the counter.

16. An apparatus according to claim 10, wherein the pre-counter is an 11 to 15-stage asynchronous counter.

17. An apparatus according to claim 8, wherein the counter is a four-stage binary counter.

18. An apparatus according to claim 8, wherein the clock generating logic sets the counter to a number between 1 and 5 after a switchingon.

19. An apparatus according to claim 8, wherein the clock generating logic enables the upward counting in four intervals each lasting 0.2 to 0.8 minutes, the logic supplying the counter with 3 to 9 pulses in the first interval, 2 to 6 pulses in the second interval, 1 to 4 pulses in the third interval and 1 to 2 pulses in the fourth interval.

20. An apparatus according to claim 8, comprises a microprocessor, for performing the control and counting functions.

21. An apparatus according to claim 8, wherein, on switching on the heating means of the cooking appliance, the clock generating logic enables the counter to count upward with a frequency dependent on the momentary state of one of the counter and a pre-counter.

22. An apparatus according to claim 8, wherein, on switching off the heating means of the cooking appliance, the clock generating logic enables the counter to count downward with a frequency dependent on the state of one of the counter and a pre-counter at the time of switching off.

23. A method according to claims 1 or 2, wherein counting in one direction takes place at a rate dependent on the momentary count result, and counting in the other direction takes place at a constant predetermined rate.

* * * * *

UNITED STATES PATENT AND TRADEMARK OFFICE
CERTIFICATE OF CORRECTION

PATENT NO. : 4,413,175
DATED : November 1, 1983
INVENTOR(S) : Wilfried Schilling, Siegberg Lorenz and Friedrich Koch It is certified that error appears in the above-identified patent and that said Letters Patent are hereby corrected as shown below:

Column 1, line 58, after "time" delete the comma.

Column 2, line 11, before the period insert --, at least within defined zones or ranges--.

Column 2, line 11, after "speed," (second occurrence) delete "at least within defined zones or ranges".

Column 2, line 43, place quotation marks before and after "recognize".

Column 3, line 4, after "be" insert --controlled by a forward pre-counter acting as a time base divider, the logic being--.

Column 4, line 14, delete "representing time abscissa" and insert --abscissa representing time--.

Signed and Sealed this

Twenty-seventh Day of November 1984

[SEAL]

Attest:

GERALD J. MOSSINGHOFF

Attesting Officer    Commissioner of Patents and Trademarks